(12) United States Patent
Hsu (10) Patent No.: US 8,143,834 B2
(45) Date of Patent: Mar. 27, 2012

(54) ELECTRONICALLY COMMUTATED SERIAL-PARALLEL SWITCHING FOR MOTOR WINDINGS

(75) Inventor: John S. Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 1073 days.

(21) Appl. No.: 12/009,732

(22) Filed: Jan. 22, 2008

(65) Prior Publication Data

US 2011/0234139 A1  Sep. 29, 2011

Related U.S. Application Data

(60) Provisional application No. 60/885,939, filed on Jan. 22, 2007, provisional application No. 60/913,363, filed on Apr. 23, 2007.

(51) Int. Cl.
*H02P 7/00* (2006.01)

(52) U.S. Cl. ............ 318/497; 318/247; 318/400.26; 318/400.27; 318/526

(58) Field of Classification Search .......... 318/400.26, 318/400.27, 247, 497, 526
See application file for complete search history.

(56) References Cited

U.S. PATENT DOCUMENTS

| | | | |
|---|---|---|---|
| 2003/0075997 A1* | 4/2003 | Keim et al. | 310/68 D |
| 2003/0205981 A1* | 11/2003 | Edelson | 318/523 |
| 2004/0104700 A1* | 6/2004 | Edelson | 318/437 |
| 2011/0057597 A1* | 3/2011 | Bosch et al. | 318/497 |
| 2011/0241592 A1* | 10/2011 | Lin | 318/497 |

* cited by examiner

*Primary Examiner* — Thomas Dougherty
(74) *Attorney, Agent, or Firm* — Boyle Fredrickson, S.C.

(57) ABSTRACT

A method and a circuit for controlling an ac machine comprises controlling a full bridge network of commutation switches which are connected between a multiphase voltage source and the phase windings to switch the phase windings between a parallel connection and a series connection while providing commutation discharge paths for electrical current resulting from inductance in the phase windings. This provides extra torque for starting a vehicle from lower battery current.

11 Claims, 9 Drawing Sheets

Fig. 1a  SERIES CONNECTION

Fig. 1b  PARALLEL CONNECTION

ELECTRONICALLY COMMUTATED SERIAL-PARALLEL SWITCHING FOR MOTOR WINDINGS

CROSS-REFERENCE TO RELATED APPLICATIONS

The benefits of priority based on U.S. Provisional Appl. No. 60/885,939 filed Jan. 22, 2007, and U.S. Provisional Appl. No. 60/913,363 filed Apr. 23, 2007 are claimed herein.

STATEMENT REGARDING FEDERALLY SPONSORED RESEARCH

This invention was made with United States Government support under Contract No. DE-AC05-00OR22725 between the United States Department of Energy and UT-Battelle, LLC. The United States Government has certain rights in this invention.

TECHNICAL FIELD

The field of the invention relates generally to ac motor drives for hybrid vehicles and more particularly to starting sequences involving a battery.

DESCRIPTION OF THE BACKGROUND ART

The following data was taken from the nameplate of a commercially available hybrid vehicle battery and from testing the battery. The battery power rating was 21 kW, 201.6V, 6.5 Amp-hrs. The nominal current was 21000 w/201.6V=104 A. The battery was rated at 104 A for 6.5 Amp-hrs./104 Amps=224 secs. However, testing showed that producing the maximum specified motor torque of 400 Nm would require 350 dc amperes of current. The fully charged battery under this condition can only lasted for 6.5 Amp-hr/350 A=66 secs.

The battery consideration is particularly important for the plug-in electric and hybrid vehicles for reducing the current requirement during starting and for accelerating in traffic. It is therefore an object of the invention to improve starting torque while reducing starting current requirements.

SUMMARY OF THE INVENTION

For a hybrid motor vehicle, the change of the connections of electrical motor windings in each phase from a parallel connection (three-phase delta configuration) to a series connection (3-phase Y configuration) to provide more turns at low speed can produce the same torque with a lower current requirement. This can reduce the demand on the battery capacity, because during starting and initial acceleration the battery may be the only source available. If other sources are available, such as a super capacitor and field enhancement, the capacity of the battery can be further reduced with a connection-change switch. In the present invention, this is carried out by utilizing a switching device as a connection change switching device to be added to an inverter to switch the phase windings to a series connection when starting or accelerating and back to invention also provides commutation paths for dissipating energy stored in the inductive motor windings.

In a further aspect of the invention the commutation paths are provided by SCRs with a low continuously operating current rating of, for example, 25 Amps, but a high pulse rating of, again for example, 350 Amps, to withstand starting and operating transients. The ratio between pulse and continuous current ratings depends on the specific SCRs.

The advantages of the present invention include: very low cost, benign failure mode, high efficiency with over 99% efficiency, small size, long life expectancy, and easy cooling.

Other objects and advantages of the invention will be apparent to those of ordinary skill in the art from the description of the preferred embodiments which follows. In the description reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION

Figure 1A:
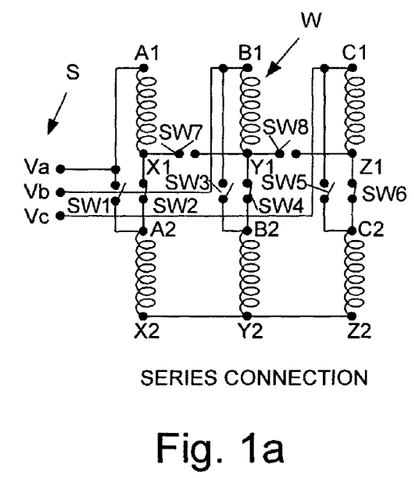
FIG. 1a is an electrical schematic of a set of three-phase motor windings with switches arranged for a series connection of the phase windings.

FIG. 1a shows the windings W for a typical three-phase ac machine M connected to a three-phase voltage source S for providing phase voltages Va, Vb and Vc through a plurality of winding terminals. The winding terminals are labeled with A1, B1, C1, X1, Y1, Z1, A2, B2, C2, X2, Y2, and Z2. Eight on-off switches SW1-SW8 are connected between the winding terminals and the phase voltages to provide a connection change device as discussed below. For this configuration in which the windings for each phase A, B or C, are in series, the switch between terminals A1 and A2 is open. The switch between terminal X1 and A2 is closed to connect the phase windings for phase A in series. Similarly, the switches between terminals B1 and B2 and between terminals C1 and C2 are open. The switches between terminals Y1 and B2 and Z1 and C2 are closed to connect the respective phase windings for phases B and C in series. The switch between terminals X1 and Y1 is open, as is the switch between terminals Y1 and Z1.

Figure 1B:
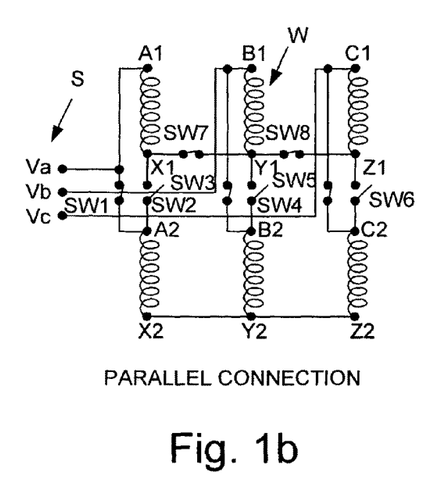
FIG. 1b is an electrical schematic of a set of three-phase motor windings with switches arranged for a parallel connection of the phase windings.

In FIG. 1b, the motor M has the eight commutation switches SW1-SW8 arranged for a parallel connection of phase windings W in the motor M. The switch SW1 between terminals A1 and A2 is now closed and the switch SW2 between terminal X1 and A2 is open to connect the phase windings for phase A in parallel. Similarly, the switches SW3 and SW4 between terminals B1 and B2 and between terminals C1 and C2 are closed. The switches SW5 and SW6 between terminals Y1 and B2 and Z1 and C2 are open to connect the respective phase windings for phases B and C in parallel. The switch SW7 between terminal X1 and Y1 is closed, as is the switch SW8 between terminals Y1 and Z1.

Figure 2:
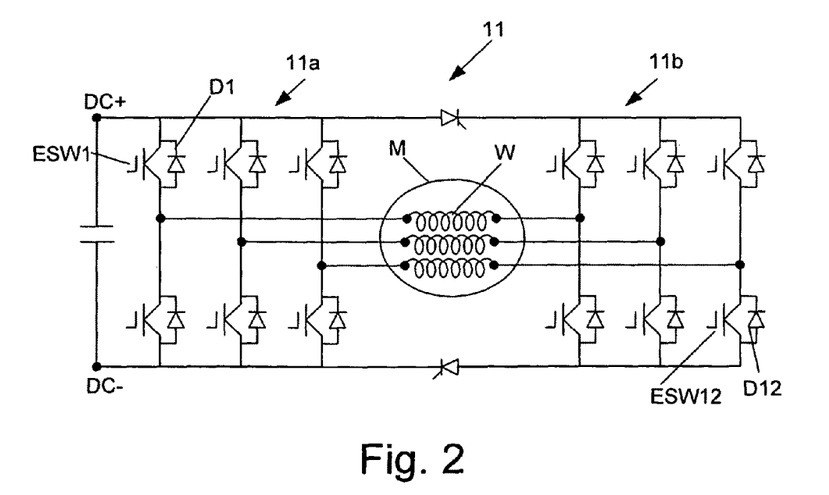
FIG. 2 is an electrical schematic diagram of a dual inverter for changing between Y and delta connections to a three phase motor.

FIG. 2 shows a dual inverter 11 of the prior art having two bridges 11a, 11b of power electronics switches ESW1-ESW12 such as insulated gate bipolar transistors (IGBTs) or the silicon controlled rectifiers (SCRs) with anti-reversing diodes D1-D12 for applying the phase signals to the motor windings W. To apply this technology to provide a change in the connection of the motor windings W between Y and delta for an effective turn change ratio of 1.73 would require at least twelve high power switches. The turn change ratio is less than 2.0 effective turn change ratio of the series and parallel connection change; furthermore at the present time the cost for the electronics switches is relatively expensive.

FIGS. 3-6 show connection change switching of the eight switches seen in FIGS. 1a and 1b in a system according to existing technology. A connection change device 20 would have a stationary ring-shaped outer portion 21 and a rotatable rotor 22. The stationary outer portion 21 would receive phase voltages Va, Vb and Vc at respective contacts 23a, 23b and 23c. Terminals X1, Y1 and Z1 would also connect to contacts 24a, 24b and 24c on the outer portion 21. Terminals A2, B2 and C2 would connect to contacts 25a, 25b and 25c on the rotor 22. The rotor 22 would be rotated part of a turn to switch the connections of the motor windings and returned to return the switching to the original configuration.

Figure 3:
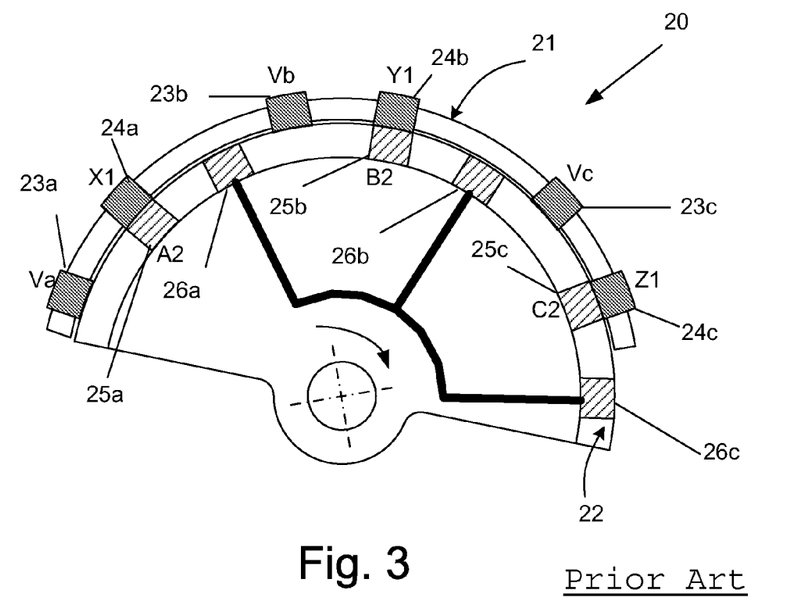
FIGS. 3-6 are fragmentary schematic diagrams of a connection change device for changing the switching between series and parallel connections without commutation paths for discharging inductive currents.

FIG. 3 shows the position of the connection change device 20 with a series connection of the motor phase windings. Contact 25a for terminal A2 contacts contact 24a for terminal X1, corresponding to the closing of the switch SW2 in FIG. 1a. Contact 25b for terminal B2 contacts contact 24b for contact Y1 and contact 24c for terminal C2 contacts contact 24c for terminal Z1 also corresponding to the switches SW7, SW8 that are closed in FIG. 1a. Three other contacts 26a, 26b and 26c are connected together to represent the Y-connection neutral point.

Figure 4:
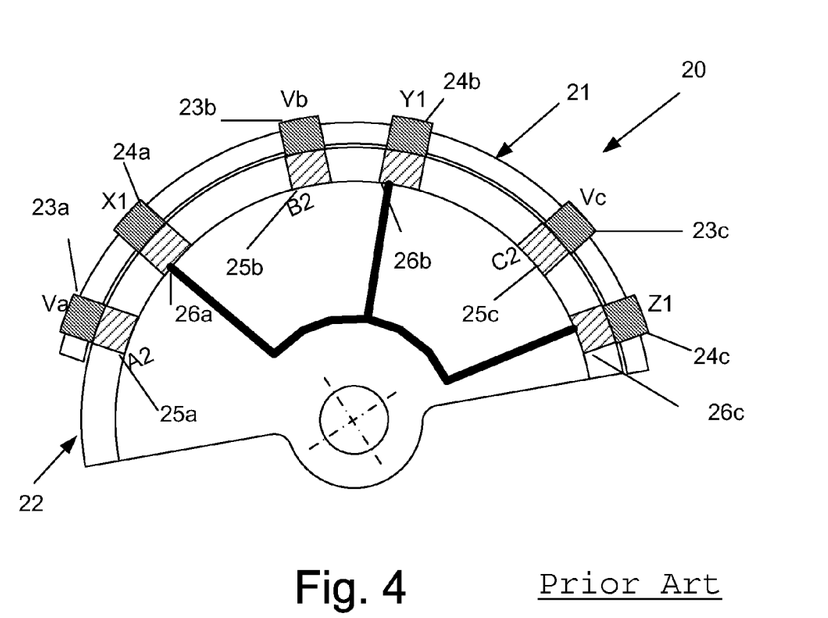

FIG. 4 illustrates the position of the connection change device 20 with a parallel connection of motor windings. Contact 25a for terminal A2 contacts contact 23a for phase voltage Va; contact 25b for terminal B2 contacts contact 23b for phase voltage Vb and contact 25c for terminal C2 contacts contact 23c for phase voltage Vc. Contacts X1, Y1 and Z1 are connected together by contacts 26a, 26b and 26c and this corresponds to the closing of switches SW7 and SW8 between contacts X1, Y1 and Z1 as shown in FIG. 1b.

Figure 5:
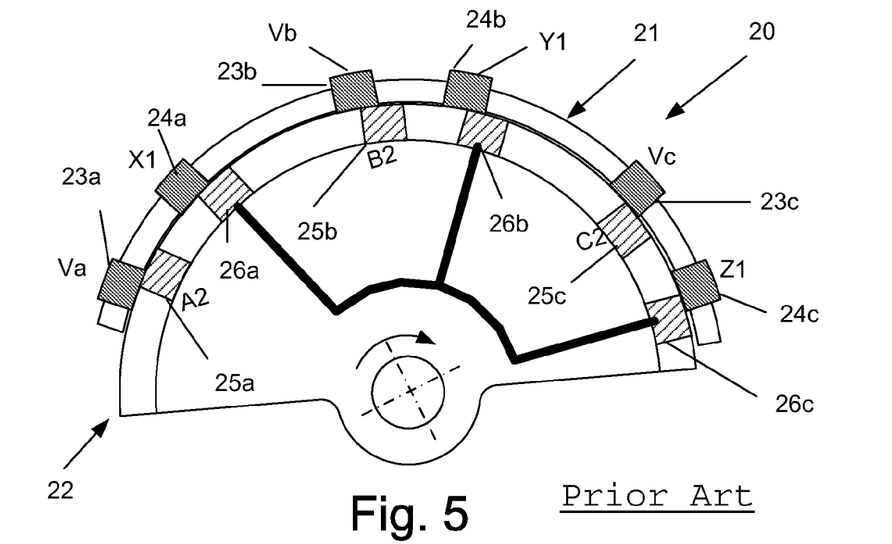
Figure 6:
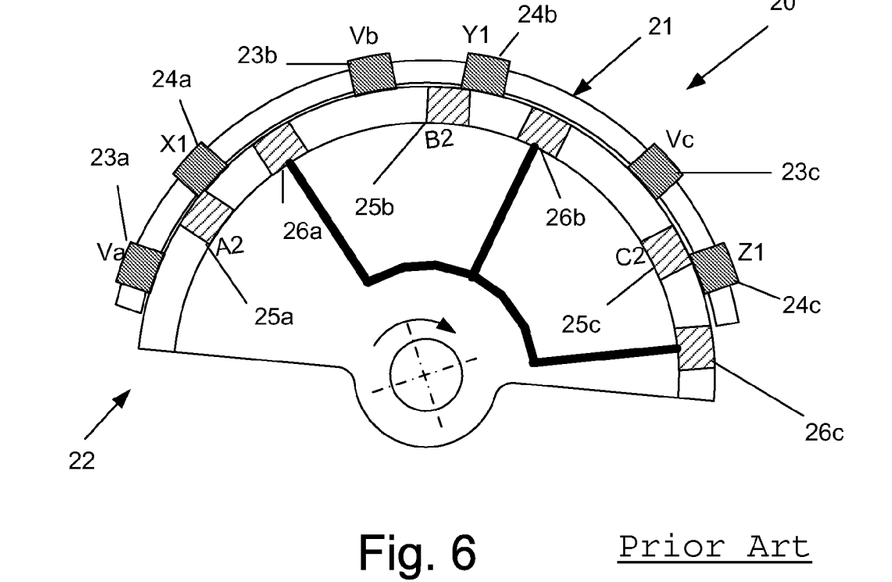

FIGS. 5 and 6 show the switching from the position in FIG. 4 (parallel) to the position in FIG. 3 (series) for starting a vehicle, for example. For example, as the contact 25a for terminal A2 slides away from contact 23a for terminal Va in FIG. 5 and toward contact 24a for terminal X1 in FIG. 6, there is a brush-type commutation action and sparking can occur. This is particularly true where there is no commutation path for absorbing energy from the motor windings. The same is true for the contacts 25b and 25c as they break contact with contacts 23b and 23c for phase voltages Vb and Vc. The contacts 26a, 26b and 26c also slide away from contacts X1, Y1 and Z1 representing the opening of the switches SW7 and SW8 in FIGS. 1a and 1b.

Figure 7:
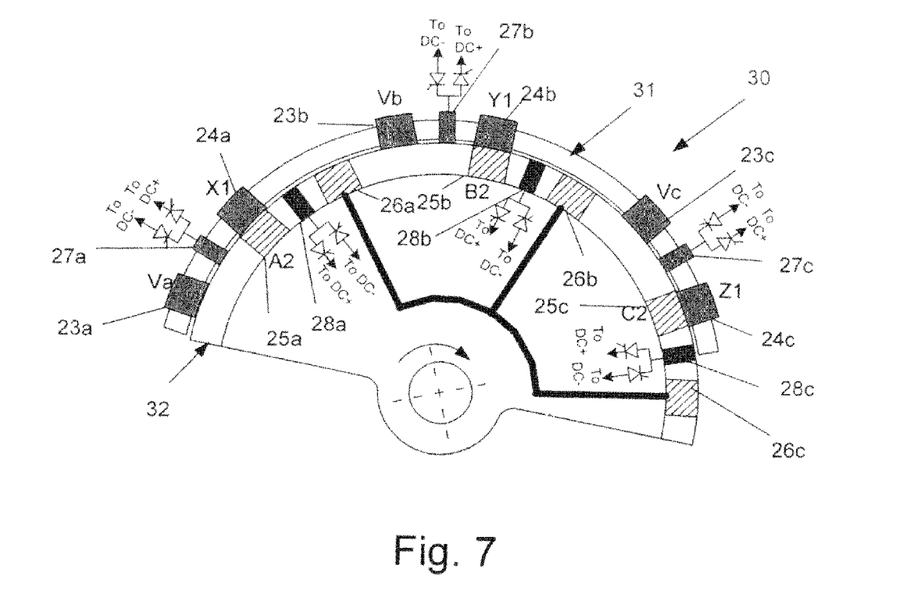
FIG. 7-10 are fragmentary schematic diagrams of a connection change device for changing the switching between series and parallel connections with commutation paths for discharging inductive currents according to the present invention.
Figure 8:
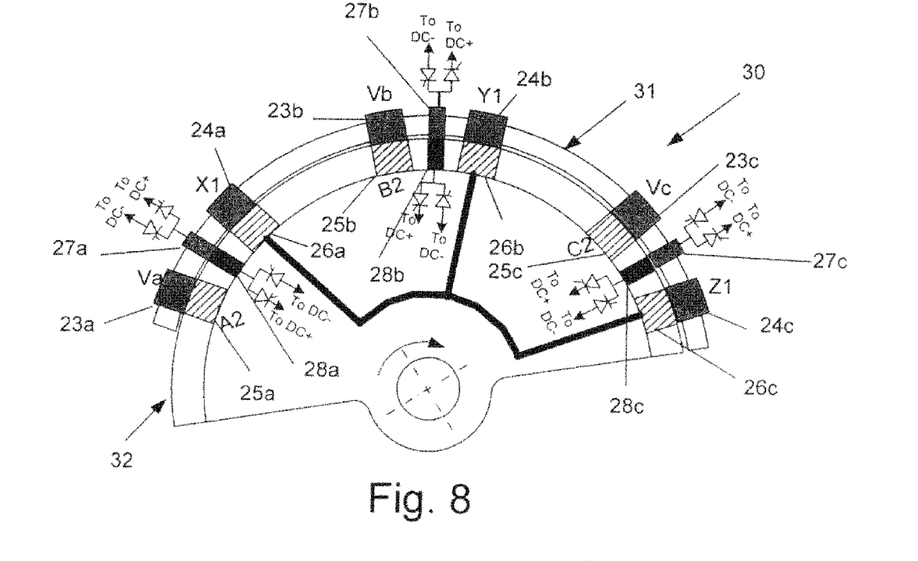

FIGS. 7 and 8 show a connection-change device 30 of the present invention having a stationary portion 31 and a movable portion 32. This device has the contacts described for the embodiment of FIGS. 3-6, but adds commutating contacts 27a, 27b and 27c to the stationary portion 31. These contacts 27a, 27b and 27c are each connected to the DC+ and DC− of a commutation path, for discharging inductive current from the motor windings. The movable portion 32 also has contacts 28a, 28b and 28c for connection to the DC+ and DC− of a commutation path, for discharging inductive current from the motor windings.

The position of the contacts shown in FIG. 7 corresponds to the series connection illustrated in FIG. 3. It can be understood clearly by comparing the labels shown in these two figures. The position of the contacts in FIG. 8 corresponds to the parallel connection in FIG. 4.

Figure 9:
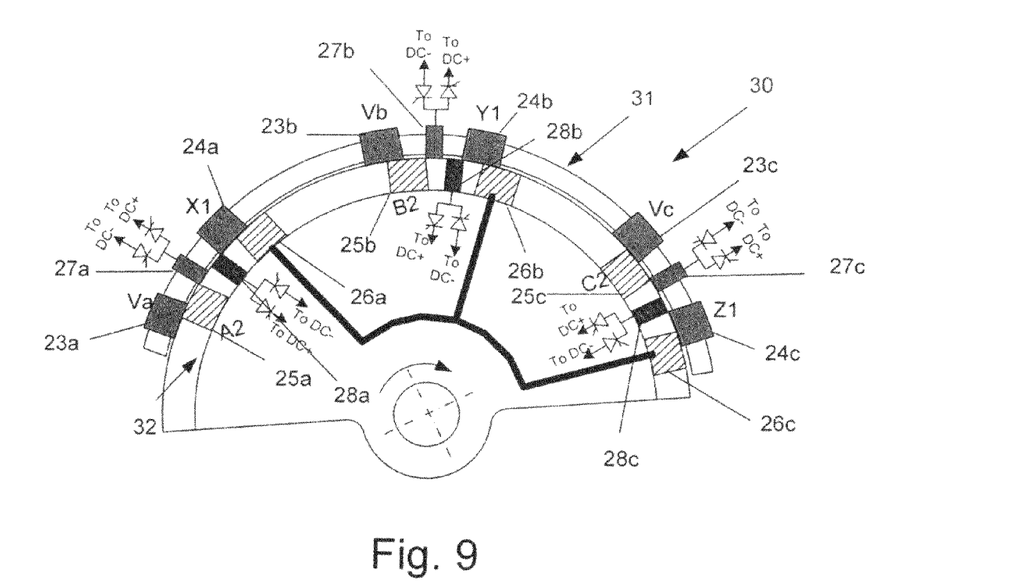
Figure 10:
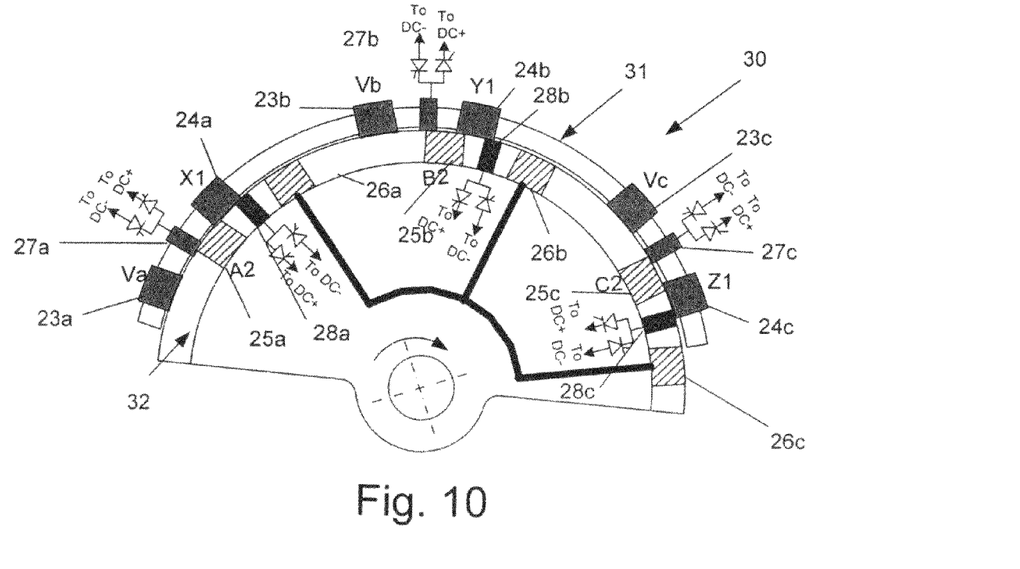

FIGS. 9 and 10 show a commutation during the connection change from parallel phase windings to series phase windings for starting a motor vehicle. The series connection provides more turns and more starting torque for less starting current, which is an object of the invention. As seen in FIG. 9, the contacts 25a, 25b and 25c connected to terminals A2, B2, and C2 start to contact their corresponding commutation brushes 27a, 27b and 27c, before breaking contacts with contacts 25a, 25b and 25c which are connected to the phase voltage terminals Va, Vb and Vc. The commutation brushes 28a, 28b and 28c contact the contacts for terminals X1, Y1, and Z1 brushes before contacts 26a, 26b and 26c break contact to open the corresponding switches. In FIG. 10, it can be seen that contacts for terminals X1 and A2 contact the commutation discharge contacts 27a and 28a as this switch SW2 is closed between the two motor windings of phase A. Thus, the commutation contacts 27a-27c and 28a-28c and their commutation paths provide for sparkless opening and closing of the switches SW1-SW8.

Figure 11:
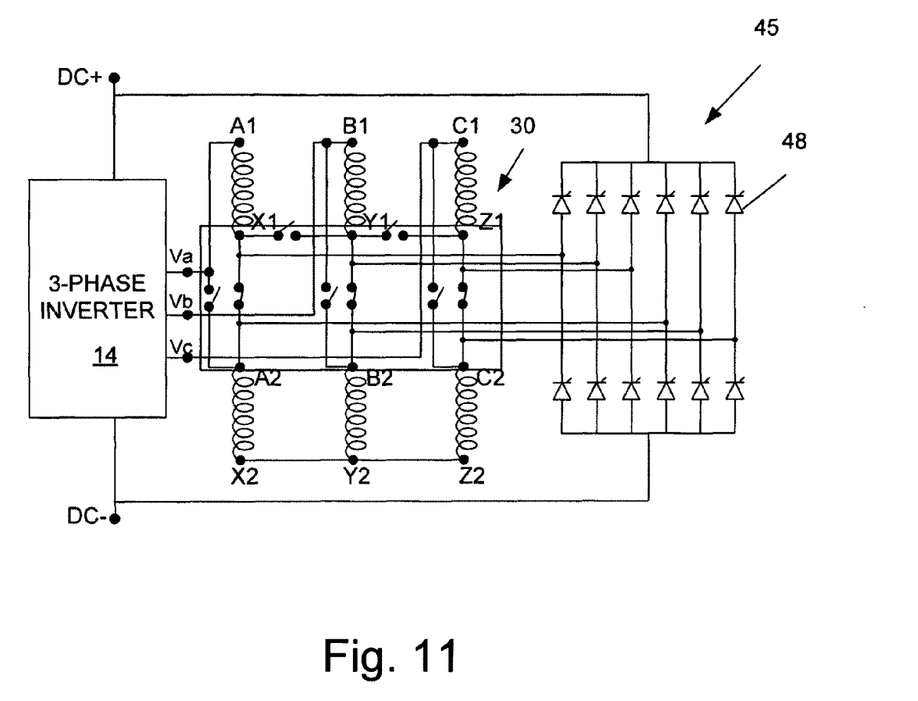
FIG. 11 is a three-phase inverter with a plurality of SCRs for providing commutation paths for discharging inductive currents caused by changing connections of the motor windings.

FIG. 11 shows an embodiment of the present invention where the commutation paths shown in FIGS. 7-10 are provided by commutation module 45 comprising a double bridge of twelve (12) small current, high pulse rating SCRs 48 that are connected to the terminals in the connection change device 30 as described previously. The connection change device 30 is connected between the multiphase voltage source and the phase windings, and has a set of contacts as described in relation to FIGS. 3-10 for conducting load currents of a magnitude conducted in the windings of the ac machine. The SCRs have a low continuously operating current rating of, for example, up to and including approximately 25 Amps, but a high pulse rating of approximately 350 Amps or greater to withstand starting and operating transients. In FIG. 11, a conventional 3-phase inverter 14 supplies phase voltages Va, Vb and Vc to the connection change device 20 represented by the switches connected between pairs of the terminals A1, B1, C1, X1, Y1, Z1, A2, B2, C2, X2, Y2, and Z2.

Figure 12A:
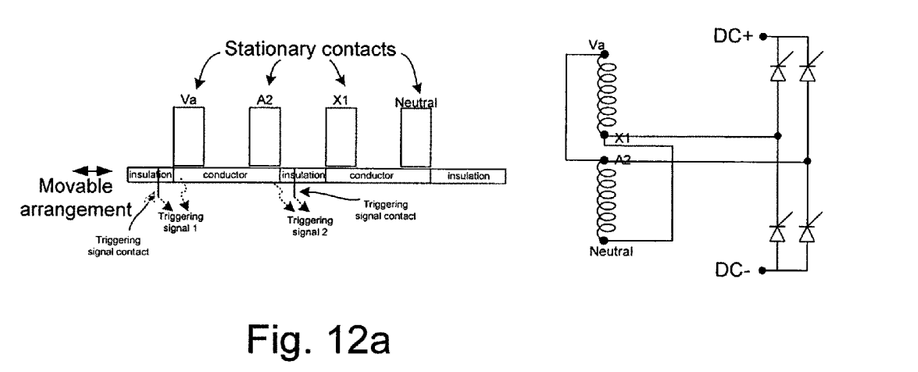
FIGS. 12a-12d are schematics a connection change device.
Figure 12B:
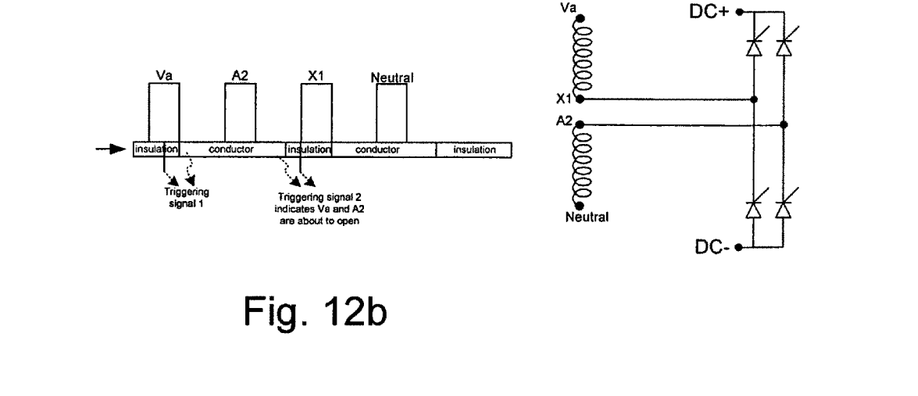
Figure 12C:
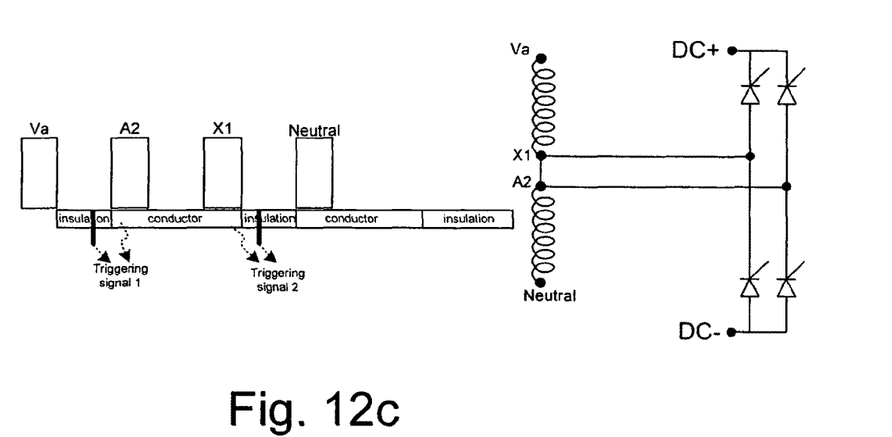
Figure 12D:
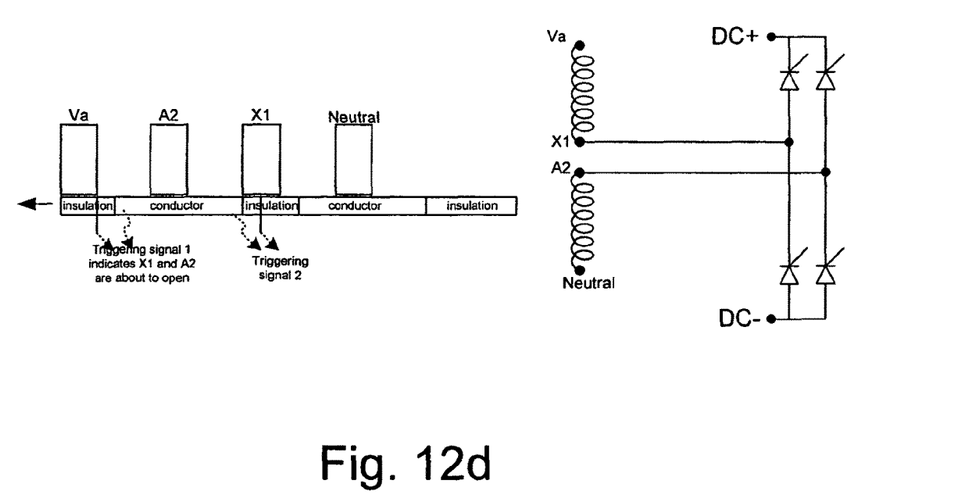

FIGS. 12a to 12d show how the timing of the SCRs in the module 45 are coordinated with the operation of the connection change device 20, which may be rotary as shown in FIGS. 3-10 or a linear device as shown in FIGS. 12a to 12d. As shown in FIG. 12a, for the parallel connection of the windings the triggering signal contacts are not touching any stationary contacts, no SCR triggering signal is produced at this position. FIG. 12b shows during the process of changing connection from parallel (FIG. 12a) towards series connection. when triggering-signal-2 contact is touching X1 right before X1 is leaving the conductor that is connected to the neutral, a triggering signal that is the potential difference between X1 and A2 is produced. The triggering signals are applied to all four of the SCRs shown. Triggering signal 1 is not used during this parallel to series change of connections. FIG. 12c shows that, in a series connection position, no triggering signal is produced. FIG. 12d shows that when X1 and A2 connections are about to open, Va starts touching triggering signal 1 contact to produce a triggering signal. Triggering signal 2 is not used during this series to parallel change. Other means such as electronic sensors based on the described requirements can be used.

Figure 13:
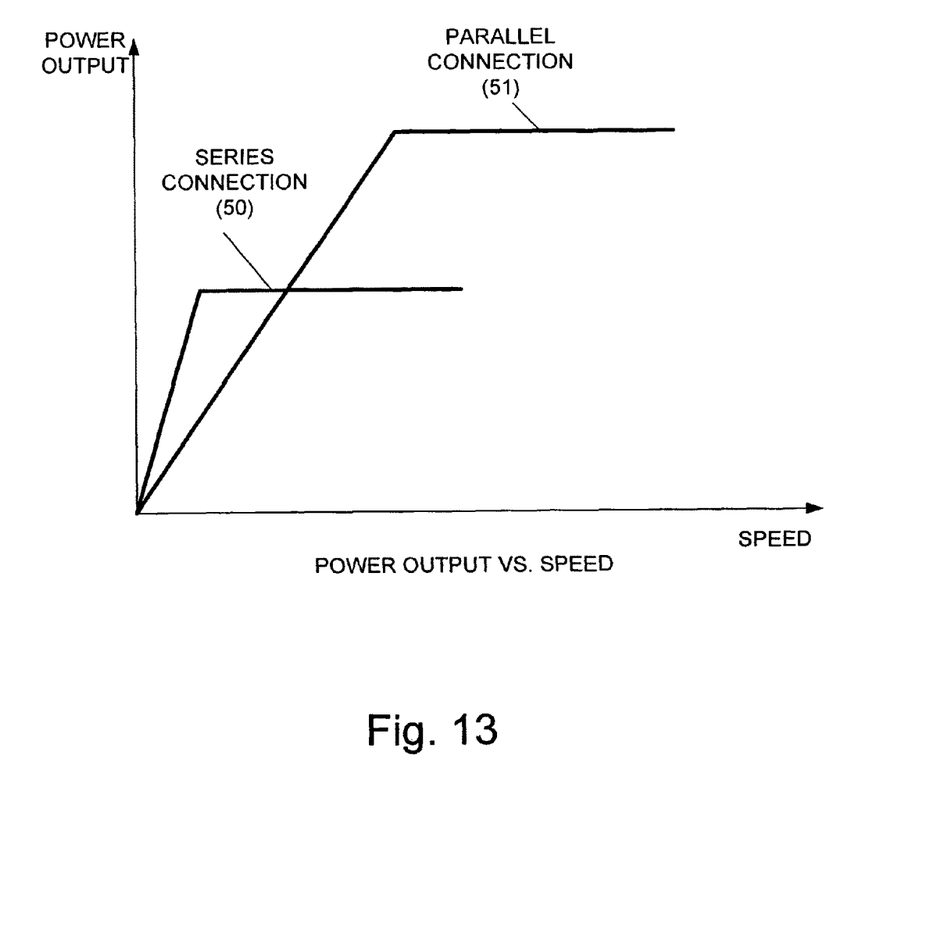
FIG. 13 is a graph of power output vs. speed for a series connection and a parallel connection of the motor windings.

FIG. 13 shows a graph of power output vs. speed for the series connection and the parallel connection. It can be seen that the series connection curve 50 provides relatively higher power than the parallel connection curve 51 at low speed, but at some point levels off and the parallel connection provides more torque and power at higher speeds.

This has been a description of a preferred embodiment of the invention at the time of filing this patent application, and it will be apparent to those of ordinary skill in the art that certain details while part of an illustrative example, may be varied in other embodiments without departing from the spirit and scope of the invention, which is defined by the following claims.

I claim:

1. A circuit for controlling an ac machine having a stator with a plurality of phase windings for each phase and a rotor, the circuit comprising:
    a switching device which is connected between a multiphase voltage source and the phase windings, the switching device having a set of contacts for conducting load currents of a magnitude conducted in the windings of the ac machine; and
    a full bridge network of solid state commutation switches connected to the switching device to provide commutation discharge paths for electrical current resulting from inductance in the phase windings when the phase windings are switched between a parallel connection and a series connection.

2. The circuit of claim 1, wherein the solid state commutation switches are SCRs with a low steady state operating current rating of up to and including approximately 25 amps and a high pulse rating of at least approximately 350 amps.

3. The circuit of claim 1, wherein the commutation switches are in addition to switches in a power inverter supplying multi-phase power to the ac machine.

4. The circuit of claim 1, wherein the ac machine is a motor.

5. The circuit of claim 1, wherein the ac machine is a three-phase machine with a plurality of phase windings for phase A, for phase B and for phase C, respectively.

6. The circuit of claim 1, wherein the switching device has a plurality of contacts for electrical connection to multiphase voltage source and has a plurality of contacts for connection to the phase windings for changing the connection of the phase windings in each phase between a parallel connection and a serial connection.

7. A method of controlling a multiphase ac machine having a stator with a plurality of phase windings for each phase and a rotor, the method comprising:
    supplying phase voltages to the phase windings from a multi-phase voltage source;
    providing an additional switching device between the phase windings and the multi-phase source; and
    controlling the additional switching device to switch the phase windings between a parallel connection and a series connection; and
    providing commutation discharge paths for electrical current resulting from inductance in the phase windings passing through the additional switching device, when the phase windings are switched between a parallel connection and a serial connection.

8. The method of claim 7, wherein the commutation discharge paths are provided by a full bridge network of SCRs with a low steady state operating current rating of no more than approximately 25 amps or less and a high pulse rating of at least approximately 350 amps.

9. The method of claim 7, wherein the commutation switches are in addition to switches in a power inverter supplying multi-phase power to the ac machine.

10. The method of claim 7, wherein the ac machine is a motor.

11. The method of claim 7, wherein the ac machine is a three-phase machine with a plurality of phase windings for phase A, for phase B and for phase C, respectively.

* * * * *